March 6, 1934. J. R. GAMMETER 1,949,465
METHOD FOR MAKING RUBBER BANDS
Filed Aug. 5, 1931 2 Sheets-Sheet 1
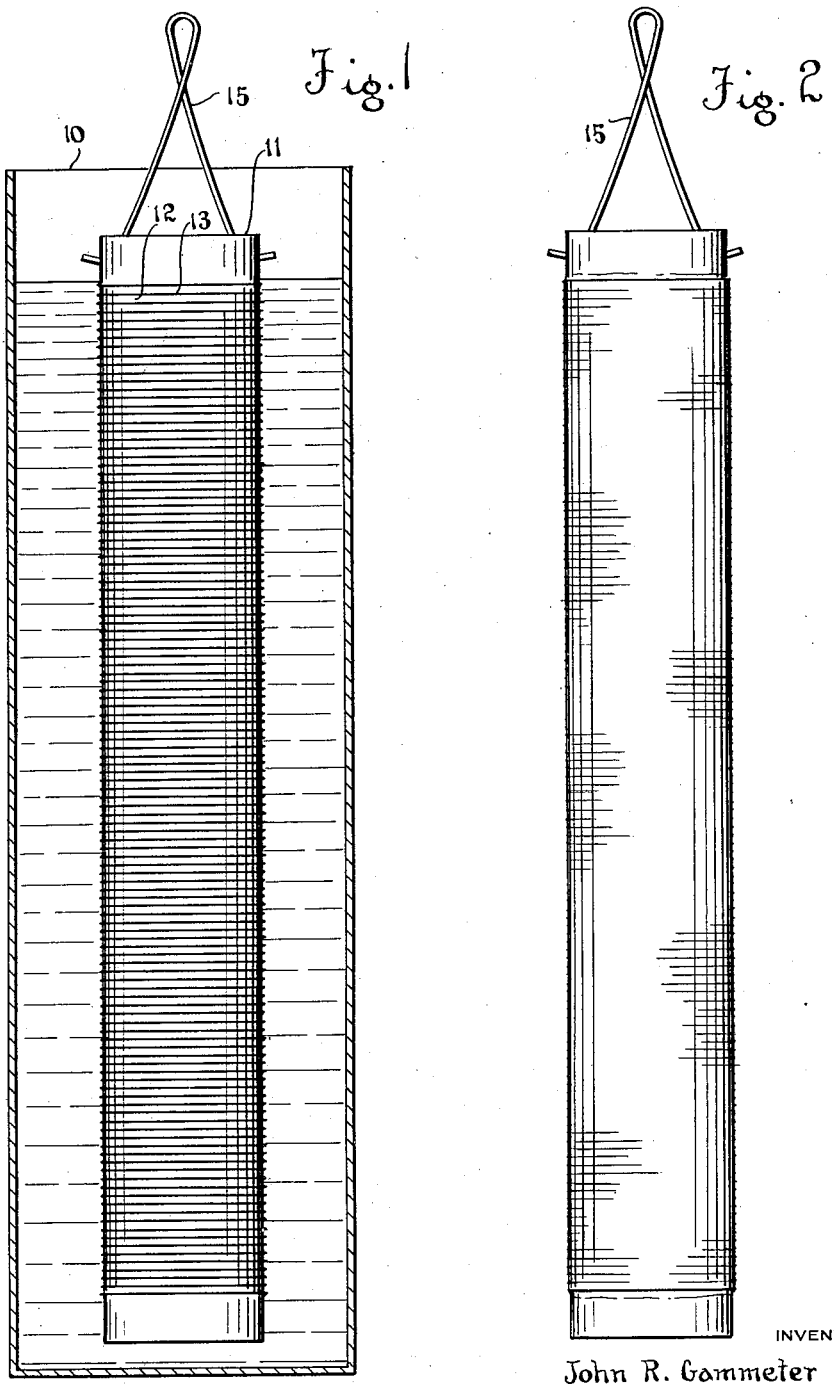
INVENTOR
John R. Gammeter March 6, 1934.  J. R. GAMMETER  1,949,465
METHOD FOR MAKING RUBBER BANDS
Filed Aug. 5, 1931    2 Sheets-Sheet 2

INVENTOR
John R. Gammeter
BY Ely & Barrow
ATTORNEYS

Patented Mar. 6, 1934

1,949,465

UNITED STATES PATENT OFFICE 1,949,465

METHOD FOR MAKING RUBBER BANDS

John R. Gammeter, Akron, Ohio, assignor to Revere Rubber Company, Providence, R. I., a corporation of Rhode Island Application August 5, 1931, Serial No. 555,246

6 Claims. (Cl. 18—58)

This invention relates to methods for making rubber bands or rings.

Heretofore, rubber bands or rings have been made utilizing crude rubber and various vulcanizing and compounding ingredients which are milled and then extruded through a tubing machine, the tube thus formed being vulcanized and the bands cut from the tube, or the rubber has been milled and calendered to sheet form, wrapped about a mandrel and cured to form a tube from which the rings are cut. These methods are quite expensive and require the use of much high-priced machinery, expensively maintained, and much skilled labor.

The general purpose of the present invention is to provide a method for making rubber bands or rings by the depositing of rubber from a liquid whereby simple, inexpensive equipment may be used and the various operations such as milling, calendering or extruding are obviated.

The foregoing and other purposes of the invention are attained by the method illustrated in the accompanying drawings and described below. It is to be understood that the method is not limited to the particular form thereof shown and described.

Of the accompanying drawings,

Figure 1 illustrates a dipping tank in diametral section with a suitable form being dipped therein in accordance with the invention;

Figure 2 is an elevation of the form after the rubber has been deposited thereon as required to make the bands;

Figure 3:
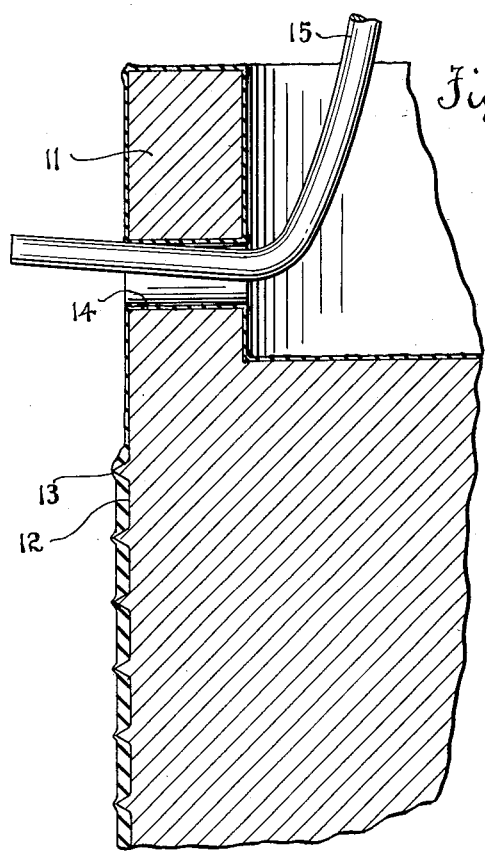
Figure 3 is a fragmentary sectional view through a portion of the form as shown in Figure 2.

Referring to the drawings, the numeral 10 designates a suitable dipping tank into which a form 11 for making rubber bands may be dipped to deposit rubber thereon from a liquid containing rubber such as latex in the tank. The latex may be raw or vulcanized. The form 11 is preferably a solid cylinder and has endless grooves 12, 12 formed closely adjacent each other therein and of the desired shape to form bands of the desired cross-section. Webs 13, 13 between the grooves are preferably comparatively sharp at their outer edges.

The form 11 may be arranged to be suspended in either of reversed positions by forming a bore a short distance in each end thereon and forming apertures in the wall of the bore as at 14, 14 to receive the ends of a suitable hanger 15.

In carrying out the method, the form, which may be previously heated to facilitate setting of the latex thereon, is dipped into the latex in one vertical position and withdrawn so as to apply a film of rubber thereto, the liquid rubber collecting in the grooves. The rubber thus deposited is dried and the form may then be reversed and again dipped in the latex, withdrawn and dried. Dippings may be made alternately with the form in opposite positions or two or more dippings may be made with the form in one position and two or more with the form in opposite position to the end that the rubber will be evenly distributed in the grooves 12 and to produce bands of the required thickness.

After the last dipping and drying operations, the rubber deposited upon the forms may be vulcanized, or when vulcanized latex is used, may be further vulcanized, as by immersion in hot water or subjection to the action of low temperature steam.

Figure 6:
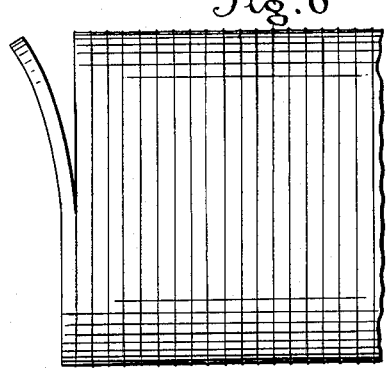
Figure 6 is a view of a tube of connected rubber bands made in accordance with the invention and showing how they may be separately removed from the tube.

When comparatively light bands are made the film of rubber deposited over the sharp webs 16 may be so light as to permit separation of the bands by merely pulling them apart. When this is true the tube of connected bands may be stripped from the form after vulcanization and sold in this condition, the consumer merely tearing a band off the tube as shown in Figure 6 as required.

Figure 4:
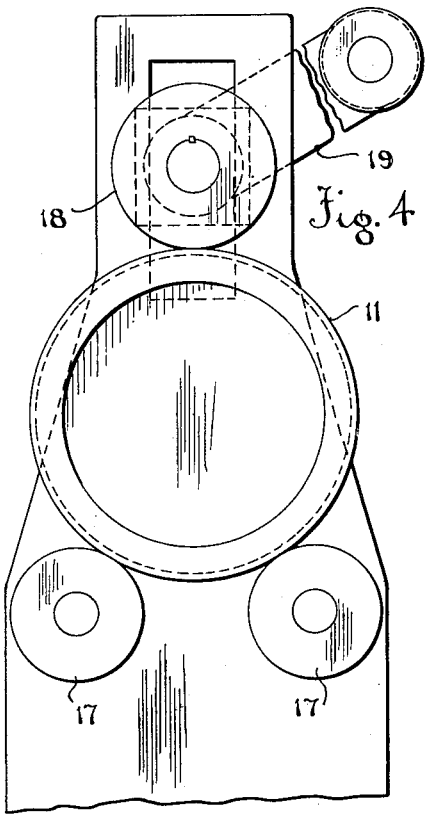
Figure 4 is a side elevation of a machine which may be used to separate the rubber bands.
Figure 5:
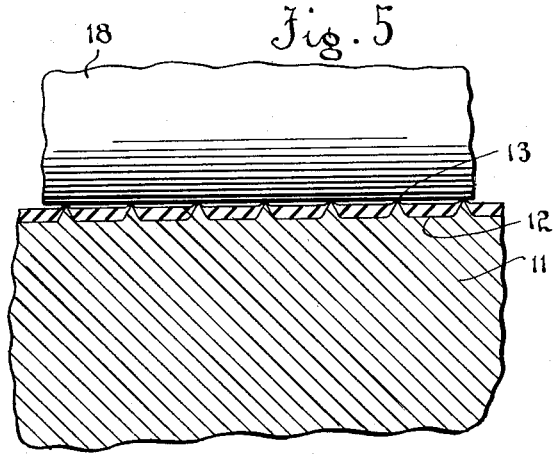
Figure 5 is a fragmentary view illustrating the action of the machine in Figure 4 to separate the bands.

Thicker bands will not so readily tear apart. These bands may be divided as illustrated in Figures 4 and 5 by mounting the cylinder 11 in a machine including lower supporting rolls 17, 17 and an upper pressure roll 18 movable against a cylinder 11 supported on rolls 17 and adapted to be driven by suitable means such as a hand crank 19 to cause the cylinder 11 to revolve between the rolls, the pressure of the rolls against the sharp edges of the webs serving to sever the connections between the bands (see Figure 5).

It will be apparent from the foregoing that an exceedingly simple economical method has been provided for making rubber bands. The invention is of course not limited to the use of the particular rubber containing liquid specified nor to the particular method disclosed for depositing rubber therefrom since the rubber may within the scope of the invention be deposited by the various types of coating operations, by coagulation or electrodeposition.

Modifications of the invention other than those specifically referred to herein may be resorted to without departing from the spirit thereof or the scope of the appended claims.

What is claimed is—

1. That method for making strand rubber which comprises depositing rubber from a liquid on a surface formed with an endless groove and with sharp edges at each side thereof whereby the rubber will collect in said groove and will deposit quite thinly over said sharp edges, applying a pressure element on said sharp edges to separate the rubber in said groove, and removing the strand rubber from said groove.

2. That method for making rubber bands which comprises depositing rubber from a liquid on a surface having a plurality of endless, closely spaced grooves therein with comparatively sharp webs between said grooves whereby the rubber will collect in the grooves to form bands and will deposit quite thinly over the webs to form easily separable connections between the bands, vulcanizing the rubber, and applying a pressure element on said sharp webs to separate said connections.

3. That method of making strand rubber which comprises depositing rubber from a liquid on a surface having a plurality of closely spaced parallel grooves therein with sharp edges between said grooves whereby the rubber will collect in said grooves and will deposit quite thinly over said sharp edges, and applying a pressure element on said sharp edges to separate the rubber in said grooves.

4. That method for making rubber bands which comprises providing a cylinder with a plurality of closely spaced circumferential grooves with comparatively sharp webs between the grooves, depositing rubber from a liquid on said cylinder whereby the rubber will collect in said grooves to form bands and will deposit quite thinly over said webs to form easily separable connections between said bands, vulcanizing the rubber, subjecting the cylinder to the action of a pressure rolling device which separates said connections and removing the bands from the cylinder.

5. That method of making strand rubber which comprises depositing rubber from a liquid in the form of a film having a plurality of parallel closely spaced relatively thick ridges of rubber which are connected together by comparatively thin rubber portions, and pressing an element against the thin portions to separate the thick ridges and form strand rubber thereby.

6. That method for making strand rubber which comprises depositing rubber from a liquid on a surface formed with an endless groove with sharp edges at each side thereof whereby the rubber will collect in said groove and will deposit quite thinly over said sharp edges, vulcanizing the rubber deposit on the surface, applying a pressure element on said sharp edges to separate the rubber in said groove, and removing the strand rubber from said groove.

JOHN R. GAMMETER.